(12) United States Patent
Seki et al.

(10) Patent No.: US 12,179,939 B2
(45) Date of Patent: Dec. 31, 2024

(54) CARGO RECEIVING FACILITY

(71) Applicant: SUBARU CORPORATION, Tokyo (JP)

(72) Inventors: Katsuya Seki, Tokyo (JP); Tomoyoshi Kuniya, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 63 days.

(21) Appl. No.: 17/949,499

(22) Filed: Sep. 21, 2022

(65) Prior Publication Data

US 2023/0101244 A1 Mar. 30, 2023

(51) Int. Cl.
*B64F 1/32* (2006.01)
*B64C 39/02* (2023.01)
*B64U 101/00* (2023.01)
*F16F 9/10* (2006.01)

(52) U.S. Cl.
CPC .............. *B64F 1/32* (2013.01); *B64C 39/024* (2013.01); *B64U 2101/00* (2023.01); *F16F 9/10* (2013.01)

(58) Field of Classification Search
None
See application file for complete search history.

(56) References Cited

U.S. PATENT DOCUMENTS

| | | | |
|---|---|---|---|
| 9,505,559 B1 * | 11/2016 | Cai | B65G 47/506 |
| 10,053,299 B1 * | 8/2018 | Vadakkanmaruveedu | B65G 47/52 |
| 10,819,273 B2 * | 10/2020 | Cromie | H02S 20/32 |
| 11,535,391 B2 * | 12/2022 | Yamada | B64C 23/00 |
| 11,643,275 B1 * | 5/2023 | Aflalo | B65G 67/00 414/298 |
| 2016/0355337 A1 * | 12/2016 | Lert | B65G 1/1378 |
| 2017/0038780 A1 * | 2/2017 | Fandetti | B64B 1/22 |
| 2017/0200248 A1 * | 7/2017 | Murphy | G06Q 10/08 |
| 2017/0217681 A1 * | 8/2017 | Tai | B65G 1/0457 |
| 2018/0229858 A1 * | 8/2018 | Eck | B64D 1/22 |
| 2019/0233103 A1 * | 8/2019 | High | B64C 39/024 |
| 2020/0031472 A1 * | 1/2020 | Martens | B64D 1/22 |
| 2020/0231302 A1 * | 7/2020 | Turner | B64D 1/12 |
| 2021/0198038 A1 * | 7/2021 | Enenkel | B65G 1/0492 |
| 2021/0371128 A1 * | 12/2021 | Rodriguez | B64F 1/322 |
| 2022/0019971 A1 | 1/2022 | Tazume | |
| 2022/0076367 A1 * | 3/2022 | Fischmann | B64D 1/14 |
| 2022/0076368 A1 * | 3/2022 | Fischmann | B64D 9/00 |
| 2022/0101472 A1 * | 3/2022 | Fischmann | G06Q 10/0832 |
| 2023/0159192 A1 * | 5/2023 | Gil | B64U 80/25 244/137.1 |

(Continued)

FOREIGN PATENT DOCUMENTS

| | | | | |
|---|---|---|---|---|
| CN | 115871947 A | * | 3/2023 | A47G 29/14 |
| DE | 102022123122 A1 | * | 3/2023 | A47G 29/14 |

(Continued)

*Primary Examiner* — Joseph A Dillon, Jr.
(74) *Attorney, Agent, or Firm* — MCGINN I.P. LAW GROUP, PLLC

(57) ABSTRACT

A cargo receiving facility includes a net and a transport mechanism. The net is suspended among supports. The net is configured to receive a cargo dropped from an unmanned aircraft in flight. The transport mechanism is configured to transport the cargo received by the net. The net has an elasticity corresponding to a mass of the cargo. The net has openings each having a size corresponding to a pressure of down-wash from the unmanned aircraft.

8 Claims, 4 Drawing Sheets

(56) References Cited

U.S. PATENT DOCUMENTS

2023/0382568 A1\* 11/2023 Qie .......................... B64F 1/30

FOREIGN PATENT DOCUMENTS

| JP | 6778847 | B1 | | 11/2020 | | |
|----|---------|----|----|---------|----|----|
| JP | 2023049614 | A | \* | 4/2023 | ............ | A47G 29/14 |
| JP | 2024034852 | A | \* | 3/2024 | | |

\* cited by examiner

CARGO RECEIVING FACILITY

CROSS-REFERENCE TO RELATED APPLICATIONS

The present application claims priority from Japanese Patent Application No. 2021-159453 filed on Sep. 29, 2021, the entire contents of which are hereby incorporated by reference.

BACKGROUND

The disclosure relates to a cargo receiving facility.

A technology for delivering a cargo on an unmanned aircraft capable of taking off and landing vertically has been developed. The unmanned aircraft used to transport the cargo is caused to fly from a place of departure to a cargo delivery port along a flight route prepared in advance.

Japanese Patent No. 6778847 discloses a technology for delivering a cargo to a delivery port provided on a facility such as an apartment house or an office building on an unmanned aircraft. The unmanned aircraft lands on the delivery port to deliver the cargo or drops the cargo from above.

SUMMARY

An aspect of the disclosure provides a cargo receiving facility. The cargo receiving facility includes a net and a transport mechanism. The net is suspended among supports. The net is configured to receive a cargo dropped from an unmanned aircraft in flight. The transport mechanism is configured to transport the cargo received by the net. The net has an elasticity corresponding to a mass of the cargo. The net has openings each having a size corresponding to a pressure of down-wash from the unmanned aircraft.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to describe the principles of the disclosure.

DETAILED DESCRIPTION

When the unmanned aircraft lands on the delivery port to deliver the cargo as described in Japanese Patent No. 6778847, the unmanned aircraft consumes energy for landing and taking off. In addition, the efficiency of reception of the cargo is reduced because it takes time for the unmanned aircraft to land and take off.

When the cargo is dropped from the unmanned aircraft and received by the delivery port as described in Japanese Patent No. 6778847, there is a risk that the cargo will be damaged due to impact. In addition, an unmanned aircraft capable of taking off and landing vertically generally includes rotors. The unmanned aircraft may be configured to take off and land vertically. Upon hovering of the unmanned aircraft, the rotors generate an airflow below the unmanned aircraft (hereinafter the airflow is referred to as down-wash). Therefore, when the cargo dropped from the unmanned aircraft is received by the delivery port as described in Japanese Patent No. 6778847, it may be difficult to appropriately receive the cargo due to the influence of down-wash.

It is desirable to provide a cargo receiving facility capable of efficiently and appropriately receiving a cargo from an unmanned aircraft capable of taking off and landing vertically.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

1. Overall Configuration of Cargo Transport System

Figure 1:
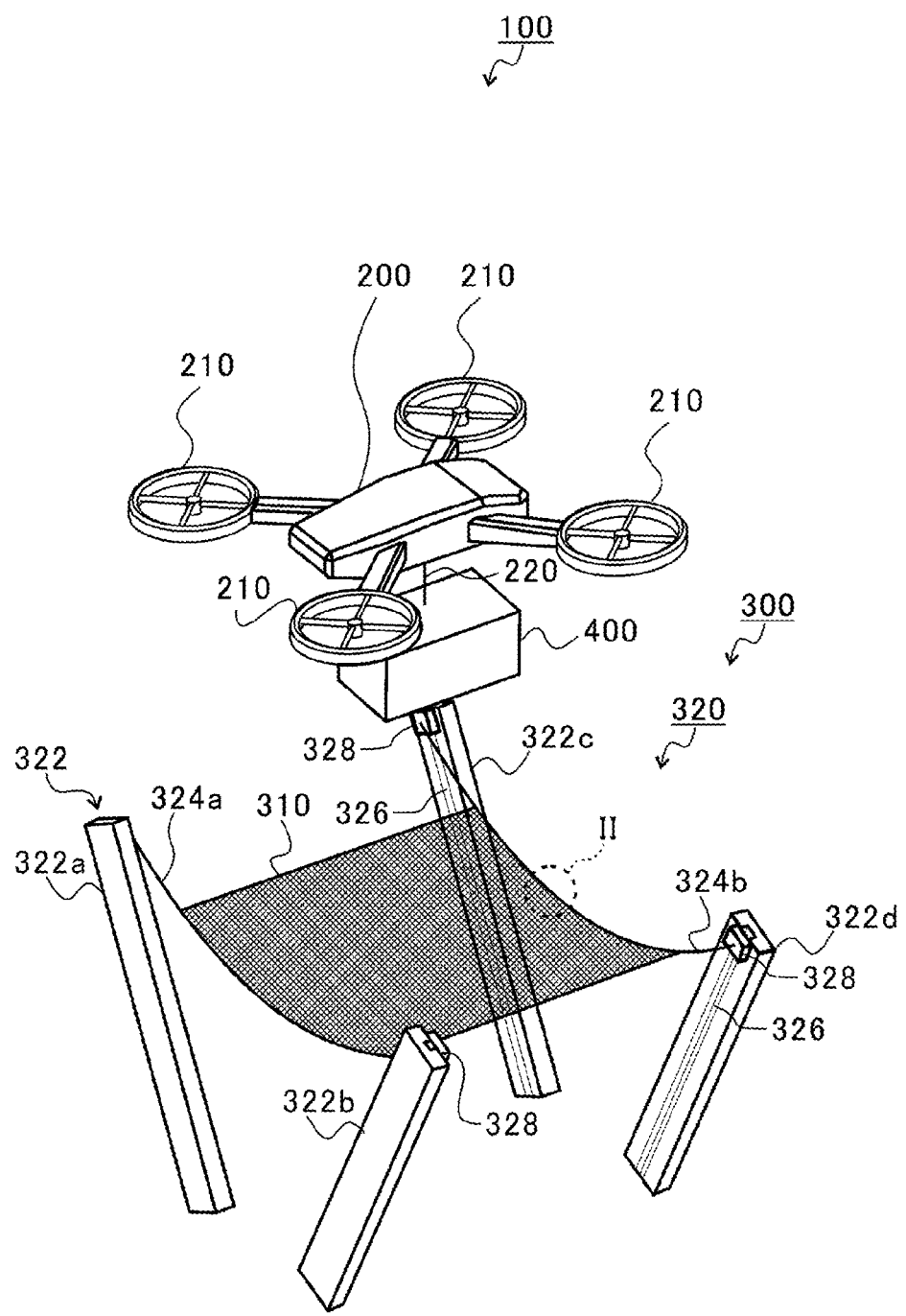
FIG. 1 is a schematic perspective view of a cargo transport system according to an embodiment of the disclosure.

The overall configuration of a cargo transport system 100 according to a first embodiment of the disclosure will be described with reference to FIG. 1. FIG. 1 is a schematic perspective view of the cargo transport system 100 according to the first embodiment of the disclosure.

As illustrated in FIG. 1, the cargo transport system 100 includes an unmanned aircraft 200, a departure site (not illustrated) from which a cargo 400 is delivered by the unmanned aircraft 200, and a cargo receiving facility 300 to which the cargo 400 is delivered. The unmanned aircraft 200 has an overall length of, for example, 3 m to 5 m. The cargo 400 is placed on the unmanned aircraft 200 at the departure site (not illustrated). The cargo 400 may be suspended from the unmanned aircraft 200, removably attached to the bottom of the unmanned aircraft 200, or placed in the unmanned aircraft 200. The unmanned aircraft 200 carries the cargo 400 from the departure site to the cargo receiving facility 300 along a flight route.

In the example illustrated in FIG. 1, the unmanned aircraft 200 includes four rotors 210 and a holding mechanism 220. The four rotors 210 rotate to generate lift and thrust for the unmanned aircraft 200. The unmanned aircraft 200 according to the present embodiment is a vertical take-off and landing (VTOL) aircraft capable of taking off and landing vertically. The unmanned aircraft 200 may instead be a so-called drone.

The holding mechanism 220 is provided on the bottom of the unmanned aircraft 200. The cargo 400 is removably held by the holding mechanism 220. The cargo 400 is attached to the holding mechanism 220 at the departure site (not illustrated) of the unmanned aircraft 200. The holding mechanism 220 holds the cargo 400 while the unmanned aircraft 200 travels from the departure site to the cargo receiving facility 300. The unmanned aircraft 200 hovers above the cargo receiving facility 300 after reaching the cargo receiving facility 300. Then, the holding mechanism 220 drops the cargo 400 toward the cargo receiving facility 300.

2. Configuration of Cargo Receiving Facility

The cargo receiving facility 300 receives the cargo 400 transported by the unmanned aircraft 200. According to the present embodiment, the cargo receiving facility 300 is installed on, for example, the roof of a building to which the cargo 400 is delivered. Examples of the building include commercial facilities, such as a distribution center, a supermarket, and a department store; industrial facilities, such as a factory and a warehouse; and public facilities, such as a school and an office facility.

The cargo receiving facility 300 includes a plurality of supports, a net 310, and a transport mechanism 320. The supports are columns supporting the net 310. For example, according to the present embodiment, the supports include a first slide rail 322a, a second slide rail 322b, a third slide rail 322c, and a fourth slide rail 322d (hereinafter sometimes collectively referred to as slide rails 322) illustrated in FIG. 1. The net 310 is suspended between the supports and disposed to spread substantially horizontally. The transport mechanism 320 transports the cargo 400 received by the net 310.

The net 310 is obtained by combining flexible linear members, such as strings and fibers, into the form of a mesh. The net 310 is made of, for example, an elastic material. The net 310 is strong enough to receive the cargo 400 dropped from the unmanned aircraft 200. The net 310 has an elasticity and a strength that corresponds to the mass of the cargo 400.

Figure 2:
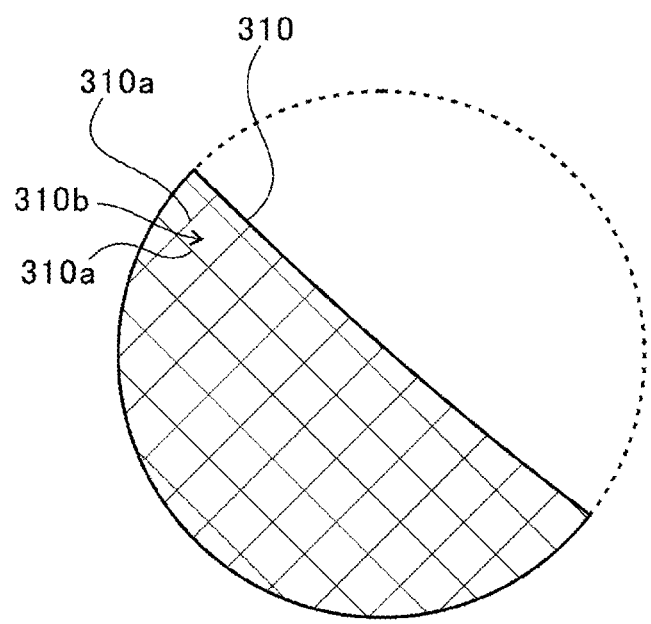
FIG. 2 is an enlarged partial view of a net according to the first embodiment.

FIG. 2 is an enlarged partial view of the net 310 according to the first embodiment of the disclosure. FIG. 2 is an enlarged view of a part II of the net 310 circled by the dashed line in FIG. 1. As illustrated in FIG. 2, the net 310 includes linear members 310a and openings 310b. The linear members 310a are composed of highly flexible strings or steel wires. The net 310 has a grid-shaped structure in which the linear members 310a are tied in the form of a grid.

In the present embodiment, the linear members 310a may be made of an elastic material, such as rubber. However, the linear members 310a are not limited to this, and may instead be woven into the net 310 in such a way that the net 310 has an elasticity.

The linear members 310a have a spring constant corresponding to the mass of the cargo 400 and the drop height. For example, the spring constant of the linear members 310a is in the range of 10 N/m to 300 N/m. In one example, when the mass of the cargo 400 is 30 kg and the drop height is 4 m, the spring constant of the linear members 310a is 73.5 N/m. When the mass of the cargo 400 is 40 kg and the drop height is 6 m, the spring constant of the linear members 310a is 147 N/m. Thus, the ratio of expansion and contraction of the linear members 310a increases as the mass of the cargo 400 increases and as the drop height increases. The spring constant and the strength of the linear members 310a are adjusted in accordance with the expected type and mass of the cargo 400.

The net 310 has the openings 310b surrounded by the linear members 310a. The openings 310b have a size corresponding to a wind load caused by the down-wash from the unmanned aircraft 200, that is, the mass of the unmanned aircraft 200, and the mass of the cargo 400. The openings 310b are large enough to allow the down-wash from the unmanned aircraft 200 to pass therethrough. Each of the openings 310b has, for example, a square shape with a side length of 5 to 10 cm. The shape of the openings 310b is not limited to this, and may instead be, for example, rectangular, circular, elliptical, rhomboidal, or polygonal.

For example, when the mass of the unmanned aircraft 200 is 300 kg and the mass of the cargo 400 is 30 kg, the ratio of the projection area of the openings 310b in the projection area of the net 310 is 10%. When the mass of the unmanned aircraft 200 is 300 kg and the mass of the cargo 400 is 15 kg, the ratio of the projection area of the openings 310b in the projection area of the net 310 is 5%. Thus, as the ratio of the mass of the unmanned aircraft 200 to the mass of the cargo 400 increases, the ratio of the projection area of the openings 310b in the projection area of the net 310 is increased. The size of the openings 310b is adjusted in accordance with the expected type of the unmanned aircraft 200 and the intensity of the down-wash. Thus, the elasticity of the linear members 310a and the size of the openings 310b are appropriately set in accordance with the cargo 400. Accordingly, the influence of the down-wash can be reduced, and the impact of the dropped cargo 400 is absorbed so that the cargo 400 can be appropriately received.

Referring again to FIG. 1, the transport mechanism 320 includes the slide rails (supports) 322 provided with dampers, a first wire 324a, and a second wire 324b.

The slide rails 322 provided with the dampers include the first slide rail 322a, the second slide rail 322b, the third slide rail 322c, and the fourth slide rail 322d (hereinafter sometimes collectively referred to as the slide rails 322). Each slide rail 322 is installed to extend upward from the roof surface of the building by using a holding member. The slide rails 322 support the net 310 at a position spaced above the roof surface of the building. The net 310 is suspended between the slide rails 322 and spreads substantially horizontally. The tension of the net 310 may be adjusted so that the net 310 appropriately receives the cargo 400 while absorbing the impact of the dropped cargo 400.

The slide rails 322a, 322b, 322c, and 322d have grooves 326 that extend in a longitudinal direction. Sliders 328 are attached to the grooves 326 so that the sliders 328 are movable back and forth along the grooves 326.

The grooves 326 are provided with coil springs (not illustrated) and dampers (not illustrated). The coil springs press the sliders 328 toward the top ends of the slide rails 322a, 322b, 322c, and 322d. The dampers are composed of, for example, cylinders in which oil and air are enclosed, and reduce vibrations of the coil springs. The dampers also function as impact absorbers that absorb an impact of the cargo 400 that is received. The grooves 326 are also provided with ratchet mechanisms that restrain the sliders 328 from returning upward until the ratchet mechanisms are released.

One end of the first wire 324a is coupled to the slider 328 on the first slide rail 322a, and the other end of the first wire 324a is coupled to the slider 328 on the second slide rail 322b. As a result, the first wire 324a extends between the first slide rail 322a and the second slide rail 322b.

One end of the second wire 324b is coupled to the slider 328 on the third slide rail 322c, and the other end of the second wire 324b is coupled to the slider 328 on the fourth slide rail 322d. As a result, the second wire 324b extends between the third slide rail 322c and the fourth slide rail 322d.

The net 310 is attached between the first wire 324 and the second wires 324b. The first and second slide rails 322a and 322b are spaced from each other in the direction in which the first wire 324a extends. The third and fourth slide rails 322c and 322d are spaced from each other in the direction in which the second wire 324b extends. The first and second slide rails 322a and 322b respectively face the third and fourth slide rails 322c and 322d with the net 310 disposed therebetween.

The interval between the bottom ends of the first and second slide rails 322a and 322b is less than the interval between the top ends of the first and second slide rails 322a and 322b. The interval between the first and second slide rails 322a and 322b gradually decreases from top to bottom. The interval between the bottom ends of the third and fourth slide rails 322c and 322d is less than the interval between the top ends of the third and fourth slide rails 322c and 322d. The interval between the third and fourth slide rails 322c and 322d gradually decreases from top to bottom.

The bottom ends of the third and fourth slide rails 322c and 322d are positioned higher than the bottom ends of the first and second slide rails 322a and 322b. The height of the bottom ends of the third and fourth slide rails 322c and 322d differs from the height of the bottom ends of the first and second slide rails 322a and 322b.

Thus, the four slide rails 322 according to the present embodiment serve as a height-difference generating mechanism that generates a height difference between parts of the net 310. To generate a height difference between parts of the net 310 means to place the net 310 at an angle with respect to a horizontal plane in a certain direction (for example, in a direction toward a take-out position 312 described below).

Figure 3:
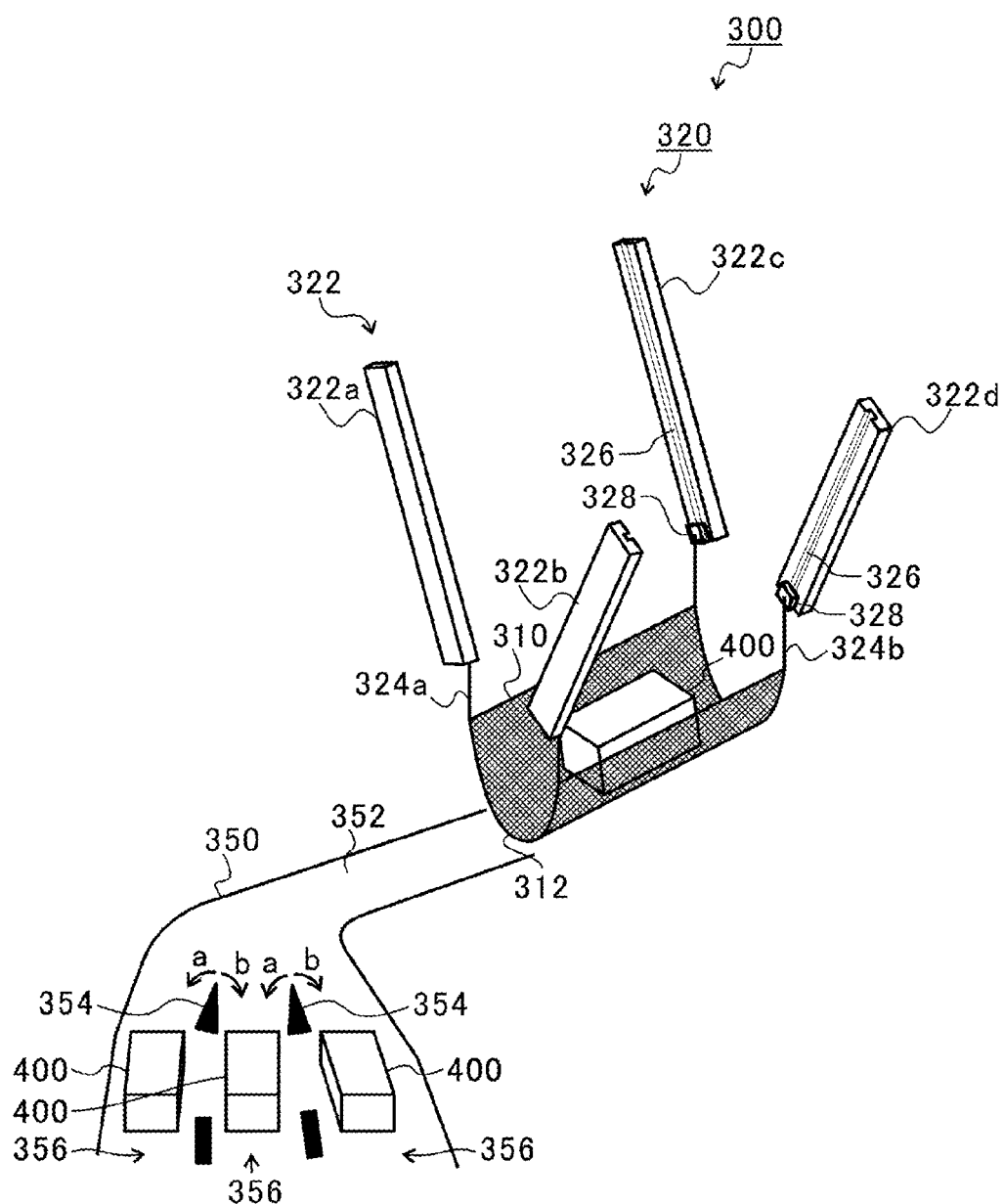
FIG. 3 is a schematic perspective view of a cargo receiving facility according to the embodiment.

FIG. 3 is a schematic perspective view of the cargo receiving facility 300 according to the first embodiment of the disclosure. As illustrated in FIG. 3, an external transport mechanism 350 includes a conveyor line 352 and sorting mechanisms 354. The conveyor line 352 is composed of, for example, a roller conveyor, and transports cargoes 400 disposed on rollers by rotating the rollers with a motor (not illustrated). The conveyor line 352 is divided into a plurality of sorting lines 356. The number of sorting lines 356 is three in the present embodiment, but is not limited to this. The number of sorting lines 356 may instead be two or four or more.

Each sorting mechanism 354 includes, for example, a triangular sorting member that is rotatable in directions a and b by a motor (not illustrated). The sorting mechanisms 354 come into contact with the cargoes 400 on the conveyor line 352 to thereby change the conveying directions of the cargoes 400. Referring to FIG. 3, the sorting mechanisms 354 each rotate in direction a or b to sort the cargoes 400 conveyed along the conveyor line 352 between the sorting lines 356. In the present embodiment, the cargoes 400 on the conveyor line 352 can be sorted between three lines and stored on the respective lines.

In the present embodiment, the external transport mechanism 350 transports the cargoes 400 received by the net 310 to a position separated from the unmanned aircraft 200 by a predetermined distance or more. As described in detail below, the cargo 400 on the net 310 is guided to the external transport mechanism 350 through the take-out position 312. The cargo 400 guided to the external transport mechanism 350 moves along the conveyor line 352, is fed to one of the three sorting lines 356 by the sorting mechanisms 354, and is stored on that sorting line 356.

The external transport mechanism 350 transports the cargoes 400 received by the net 310 to the position separated from the unmanned aircraft 200 by the predetermined distance or more. Therefore, a worker can safely unpack the cargoes 400 without being affected by the down-wash from the unmanned aircraft 200 or being hit by another cargo 400 that has been dropped. The sorting mechanisms 354 may sort the cargoes 400 in accordance with, for example, the type, size, mass, or shape of the cargoes 40. Therefore, workload of a worker that sorts the cargoes 400 received by the net 310 can be reduced.

3. Operation of Cargo Receiving Facility

The operation of the cargo receiving facility 300 according to present embodiment will now be described with reference to FIGS. 1 to 3.

First, as illustrated in FIG. 1, the unmanned aircraft 200 carries the cargo 400 to the cargo receiving facility 300 and hovers above the cargo receiving facility 300.

Next, the holding mechanism 220 of the unmanned aircraft 200 drops the cargo 400 toward the cargo receiving facility 300. Accordingly, as illustrated in FIG. 3, the cargo 400 dropped from the holding mechanism 220 of the unmanned aircraft 200 falls onto the net 310.

When the cargo 400 falls onto the net 310, load is transmitted to the coil springs and the dampers through the first wire 324a, the second wire 324b, and the sliders 328, so that the coil springs and the dampers contract. When the coil springs and the dampers contract, the sliders 328 move from the top ends toward the bottom ends of the slide rails 322a, 322b, 322c, and 322d.

As described above, the interval between the first and second slide rails 322a and 322b decreases toward the bottom. Similarly, the interval between the third and fourth slide rails 322c and 322d also decreases toward the bottom.

Therefore, when the sliders 328 move downward along the slide rails 322 upon reception of the cargo 400 as illustrated in FIG. 3, the first and second wires 324a and 324b sag downward. Accordingly, the net 310 also sags downward. As the first and second wires 324a and 324b sag downward, the amount of sag of the net 310 increases. As the amount of sag of the net 310 increases, the cargo 400 is guided toward the center of the net 310 due to its own weight. As described above, the net 310 is elastic, and the sliders 328 move downward along the slide rails 322 while the dampers exert an impact absorbing function. Therefore, the net 310 is capable of reliably receiving the cargo 400 that has been dropped.

After that, the cargo 400 received by the net 310 automatically moves to the take-out position 312 at one end of the net 310 due to the height-difference generating mechanism. In one example, the bottom ends of the third and fourth slide rails 322c and 322d are positioned higher than the bottom ends of the first and second slide rails 322a and 322b. As illustrated in FIG. 3, when the net 310 reaches the bottom ends and sags, an end of the net 310 at a side adjacent to the third and fourth slide rails 322c and 322d is positioned higher than an end of the net 310 at a side adjacent to the first and second slide rails 322a and 322b. As a result, the sagging net 310 is inclined downward in a direction from the third and fourth slide rails 322c and 322d toward the first and second slide rails 322a and 322b.

Accordingly, the cargo 400 on the net 310 may be caused to slide in the direction from the third and fourth slide rails 322c and 322d toward the first and second slide rails 322a and 322b. In other words, the cargo 400 on the net 310 may be caused to slide toward the take-out position 312. As a result, the cargo 400 is guided along the net 310 to the take-out position 312 at one end of the net 310.

The external transport mechanism 350 is disposed adjacent to the take-out position 312 on the net 310. The cargo 400 that has moved to the take-out position 312 is guided to the external transport mechanism 350.

After the cargo 400 is moved from the net 310 to the external transport mechanism 350, the ratchet mechanisms on the grooves 326 are released. Accordingly, load applied to the coil springs on the slide rails 322 is eliminated, and the coil springs expand. When the coil springs expand, the sliders 328 move from the bottom ends of the slide rails 322 toward the top ends.

4. Summary

According to the present embodiment, the cargo receiving facility 300 is capable of appropriately receiving the cargo 400 dropped form the unmanned aircraft 200 in flight. Therefore, the building provided with the cargo receiving facility 300 may include no take-off and landing area for the unmanned aircraft 200. Since the unmanned aircraft 200 may not land on or take off from the cargo receiving facility 300 on the building, energy consumed when the unmanned aircraft 200 lands and takes off may be reduced.

Since the unmanned aircraft 200 takes no time to land and take off, multiple cargoes 400 can be successively received by a single cargo receiving facility 300. Accordingly, the time efficiency of the process of receiving the cargoes 400 can be increased. In addition, each cargo 400 can be received without human intervention, and therefore the number of workers can be reduced.

The cargo receiving facility 300 includes the net 310 that is suspended between the supports (for example, the slide rails 322a, 322b, 322c, and 322d). The net 310 has an elasticity that corresponds to the mass of the cargo 400. Therefore, the impact of the cargo 400 dropped onto the net 310 can be reduced.

The net 310 has the openings having a size corresponding to the pressure of the down-wash from the unmanned aircraft 200. Accordingly, when the cargo 400 is dropped onto the net 310 and down-wash is generated by the rotors 210 of the unmanned aircraft 200, irregular and unsteady movement of the cargo 400 on the net 310 due to the down-wash can be suppressed. As a result, the cargo receiving facility 300 is capable of appropriately receiving the cargo 400 dropped from the unmanned aircraft 200.

The slide rails 322a, 322b, 322c, and 322d are provided with the sliders 328 coupled to the ends of the net 310. The sliders 328 move along the slide rails 322a, 322b, 322c, and 322d to reduce the impact of the cargo 400 dropped onto the net 310 from the unmanned aircraft 200.

The slide rails 322a, 322b, 322c, and 322d are also provided with the dampers that absorb an impact of the sliders 328 that move downward along the slide rails 322a, 322b, 322c, and 322d. Accordingly, the impact of the sliders 328 that move downward along the slide rails 322a, 322b, 322c, and 322d can be reduced.

According to the present embodiment, the cargo receiving facility 300 may simply have a space for receiving a single cargo 400 on the roof of the building and a space for storing the received cargo 400. Thus, the infrastructure cost of the building can be reduced.

The bottom ends of the third and fourth slide rails 322c and 322d are positioned higher than the bottom ends of the first and second slide rails 322a and 322b. Accordingly, when the cargo 400 is dropped onto the net 310, a bottom end of the net 310 at a side adjacent to the third and fourth slide rails 322c and 322d is positioned higher than the bottom end of the net 310 at a side adjacent to the first and second slide rails 322a and 322b.

Thus, according to the present embodiment, the first slide rail 322a, the second slide rail 322b, the third slide rail 322c, and the fourth slide rail 322d function as a height-difference generating mechanism that generates a height difference between parts of the net 310. Since a height difference is generated between parts of the net 310, the cargo 400 received by the net 310 can be automatically slid to the take-out position 312, and be moved from the take-out position 312 to the external transport mechanism 350. Thus, the cargo 400 received by the net 310 may be moved to the external transport mechanism 350 without using any driving device.

The external transport mechanism 350 transports the cargo 400 received by the net 310 to a position outside the net 310 and separated from the unmanned aircraft 200. Therefore, the cargo 400 can be opened and closed at a position separated from the unmanned aircraft 200. As a result, the cargo 400 can be easily unpacked by an ordinary worker other than a dedicated operator.

When the cargo 400 is dropped onto the net 310, the weight on the unmanned aircraft 200 is reduced by the weight of the cargo 400. Therefore, when the unmanned aircraft 200 returns to the departure site from the cargo receiving facility 300 and lands on the departure site, the unmanned aircraft 200 takes a uniform landing position and can be easily controlled.

5. Second Embodiment

Figure 4:
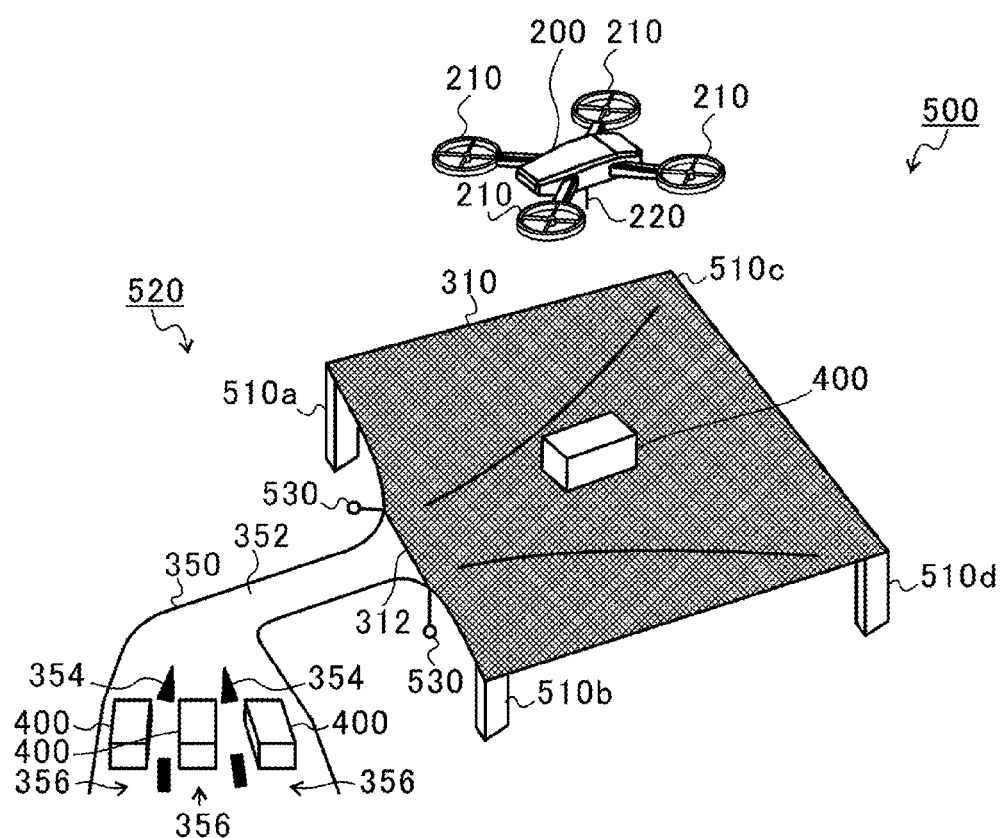
FIG. 4 is a schematic perspective view of a cargo receiving facility according to an embodiment of the disclosure.

A cargo receiving facility according to a second embodiment of the disclosure will now be described with reference to FIG. 4. FIG. 4 is a schematic perspective view of a cargo receiving facility 500 according to the second embodiment of the disclosure.

Components of the cargo receiving facility 500 according to the second embodiment that are substantially the same as those of the cargo receiving facility 300 according to the first embodiment will be denoted by the same reference signs, and description thereof will be omitted.

As illustrated in FIG. 4, the cargo receiving facility 500 according to the second embodiment includes a plurality of supports (a first column 510a, a second column 510b, a third column 510c, and a fourth column 510d), a net 310, and a transport mechanism 520.

The supports are columns that support the net 310. The supports according to the present embodiment include the first column 510a, the second column 510b, the third column 510c, and the fourth column 510d (hereinafter sometimes collectively referred to as columns 510). The columns 510 have the same height. The four columns 510 support the net 310 at a position spaced above the roof surface of the building.

The transport mechanism 520 includes a height-difference generating mechanism 530 and an external transport mechanism 350. The height-difference generating mechanism 530 applies a downward tension to the net 310 at a take-out position 312 at one end of the net 310 to generate a height difference between parts of the net 310.

According to the height-difference generating mechanism 530, an end of the net 310 at a side adjacent to the third and fourth columns 510c and 510d is positioned higher than an end of the net 310 adjacent to the first and second columns 510a and 510b at the take-out position 312. According to the height-difference generating mechanism 530, at least a part of the net 310 is inclined downward toward the take-out position 312. Accordingly, the cargo 400 on the net 310 can be automatically slid toward the take-out position 312 in a direction from the third and fourth columns 510*c* and 510*d* toward the first and second columns 510*a* and 510*b*.

As described above, according to the second embodiment, the cargo receiving facility 500 includes the columns 510*a*, 510*b*, 510*c*, and 510*d* as the supports for supporting the net 310 in place of the slide rails 322 provided with dampers according to the first embodiment. Accordingly, the structure of the supports is simpler than that in the cargo receiving facility 300 according to the first embodiment. In addition, the above-described operation and effects of the first embodiment can be provided.

Although embodiments of the disclosure have been described with reference to the accompanying drawings, the disclosure is, of course, not limited to the above-described embodiments. It is obvious that various alterations and modifications are conceivable by those skilled in the art within the scope defined by the claims, and such alterations and modifications are to be understood as being included in the technical scope of the disclosure.

In the above-described embodiments, the cargo receiving facilities 300 and 500 each include the height-difference generating mechanism 530 that applies a height difference between parts of the net 310. However, the height-difference generating mechanism 530 may be omitted. Thus, the cargo receiving facility may include no height-difference generating mechanism.

In the above-described embodiments, the cargo receiving facilities 300 and 500 each include the external transport mechanism 350 that transports the cargo 400 to the outside of the net 310. However, the external transport mechanism 350 may be omitted. Thus, the cargo receiving facility may include no external transport mechanism 350.

The disclosure provides a cargo receiving facility capable of efficiently and appropriately receiving a cargo from an unmanned aircraft capable of taking off and landing vertically.

The invention claimed is:

1. A cargo receiving facility comprising:
a net suspended among supports, the net being configured to receive a cargo dropped from an unmanned aircraft in flight; and
a transport mechanism configured to transport the cargo received by the net,
wherein the net has an elasticity corresponding to a mass of the cargo, and
wherein the net has openings each having a size corresponding to a pressure of down-wash from the unmanned aircraft,
wherein the transport mechanism comprises a height-difference generating mechanism configured to generate a height difference among parts of the net, and
wherein the height-difference generating mechanism causes the cargo received by the net to slide to a take-out position at one end of the net.

2. The cargo receiving facility according to claim 1, wherein the transport mechanism comprises an external transport mechanism configured to transport the cargo slid to the take-out position at the one end of the net to outside of the net.

3. A cargo receiving facility comprising:
a net suspended among supports, the net being configured to receive a cargo dropped from an unmanned aircraft in flight; and
a transport mechanism configured to transport the cargo received by the net,
wherein the net has an elasticity corresponding to a mass of the cargo, and
wherein the net has openings each having a size corresponding to a pressure of down-wash from the unmanned aircraft,
wherein each of the supports comprises a slide rail provided with a slider coupled to a corresponding end of the net.

4. The cargo receiving facility according to claim 1, wherein each of the supports comprises a slide rail provided with a slider coupled to a corresponding end of the net.

5. The cargo receiving facility according to claim 2, wherein each of the supports comprises a slide rail provided with a slider coupled to a corresponding end of the net.

6. The cargo receiving facility according to claim 3, wherein the slide rail is provided with a damper configured to absorb an impact that is to be generated when the slider moves downward along the slide rail.

7. The cargo receiving facility according to claim 4, wherein the slide rail is provided with a damper configured to absorb an impact that is to be generated when the slider moves downward along the slide rail.

8. The cargo receiving facility according to claim 5, wherein the slide rail is provided with a damper configured to absorb an impact that is to be generated when the slider moves downward along the slide rail.

* * * * *